(12) United States Patent
Kamihara

(10) Patent No.: US 9,405,439 B2
(45) Date of Patent: Aug. 2, 2016

(54) AUDIO SIGNAL CONTROLLER

(75) Inventor: Masanori Kamihara, Hamamatsu (JP)

(73) Assignee: YAMAHA CORPORATION, Hamamatsu-shi (JP)

( * ) Notice: Subject to any disclaimer, the term of this patent is extended or adjusted under 35 U.S.C. 154(b) by 822 days.

(21) Appl. No.: 13/435,150

(22) Filed: Mar. 30, 2012

(65) Prior Publication Data

US 2012/0250896 A1    Oct. 4, 2012

(30) Foreign Application Priority Data

Mar. 30, 2011    (JP) ................................. 2011-073958

(51) Int. Cl.
*H03G 3/00*    (2006.01)
*G06F 3/0484*    (2013.01)
(Continued)

(52) U.S. Cl.
CPC ............ *G06F 3/0484* (2013.01); *G06F 3/0488* (2013.01); *H04R 3/00* (2013.01); *G11B 27/034* (2013.01); *H04S 7/00* (2013.01); *H04S 2400/15* (2013.01)

(58) Field of Classification Search
CPC .............. G06F 3/04883; G06F 3/0433; G06F 2200/1636; G06F 3/043; G06F 3/0488; G06F 3/017; G06F 1/1626; G06F 2203/04808; G06F 3/038; G06F 2203/04806; G06F 3/041; G06F 3/0414; G06F 3/0416; G06F 3/0484; G06F 1/1694; G06F 2200/1637; G06F 2203/04105; G06F 3/011; G06F 3/0346; H04R 1/1041; H04R 3/005; H04R 2201/401; H04R 2499/11; H04R 1/083; H04R 2400/01; H04R 2400/03; H04R 2420/01; H04R 2420/05; H04R 2420/07; H04R 25/00; H04M 1/605; H04M 1/7253; H04M 1/72547
USPC ............... 381/306, 302, 56, 61, 86, 333, 109, 381/110, 119, 120, 123, 314, 74, 111, 92, 381/122; 345/123, 341, 156–163, 169, 345/173–177, 180, 182, 660, 665, 864, 345/784; 715/835, 862, 863, 859, 808, 792, 715/860, 696; 340/573.1; 702/57; 704/251, 704/201, 278, 205; 178/18.01–18.11; 370/462; 700/94

See application file for complete search history.

(56) References Cited

U.S. PATENT DOCUMENTS 5,257,317 A * 10/1993 Stavrou ........................ 381/119
8,516,394 B2    8/2013 Lee et al.
(Continued)

FOREIGN PATENT DOCUMENTS

CN    101789249 A    7/2010
CN    101789250 A    7/2010
(Continued)

OTHER PUBLICATIONS

Yamaha, "Digital Mixing Studio n8/n12 Owner's Manual".
(Continued)

*Primary Examiner* — Leshui Zhang
(74) *Attorney, Agent, or Firm* — Rossi, Kimms & McDowell LLP

(57) ABSTRACT

It is determined whether user's operation performed on a control is normal or special operation. A function of increasing or decreasing a value of a parameter assigned to the control is performed if the user's operation is the normal operation. Another function, different from the function of increasing or decreasing a value of a parameter, is performed if the user's operation is the special operation. The control comprises, for example, a touch pad provided with a display device for displaying a current operating position of the control. If a user touches one point of the pad with its finger or touches one point of the pad and then continuously slides its finger on and along the pad, such user's operation is determined to be the normal operation. If the user touches or taps two or more points of the pad, such user's operation is determined to be the special operation.

17 Claims, 6 Drawing Sheets

(51) Int. Cl.
   *G06F 3/0488* (2013.01)
   *H04R 3/00* (2006.01)
   *G11B 27/034* (2006.01)
   *H04S 7/00* (2006.01)

(56) References Cited

U.S. PATENT DOCUMENTS

| | | |
|---|---|---|
| 2007/0229474 A1 | 10/2007 | Okabayashi |
| 2008/0170726 A1 | 7/2008 | Cabot |
| 2008/0202823 A1* | 8/2008 | Won et al. .................. 178/18.01 |
| 2010/0188351 A1 | 7/2010 | Lee et al. |
| 2010/0245277 A1* | 9/2010 | Nakao ........................... 345/173 |

FOREIGN PATENT DOCUMENTS

| | | | | |
|---|---|---|---|---|
| JP | 2007-074359 A | 3/2007 | | |
| JP | 2007267135 A | 10/2007 | | |
| JP | 2010282259 A | * 12/2010 | ................ | G06F 3/41 |
| WO | WO2009157592 | * 12/2009 | ............. | G06F 3/041 |
| WO | 2010078372 A1 | 7/2010 | | |

OTHER PUBLICATIONS

Notification of the First Office Action for corresponding CN201210088814.6, dated May 30, 2014. English translation provided.

Japanese Office Action issued in Japanese counterpart application No. JP2011-073958, dated Jun. 2, 2015. English translation provided.

European Search Report issued in European counterpart application No. EP12162486.0, dated Mar. 5, 2015.

Official Action issued in European Appln. No. 12162486.0 mailed Feb. 24, 2016.

\* cited by examiner

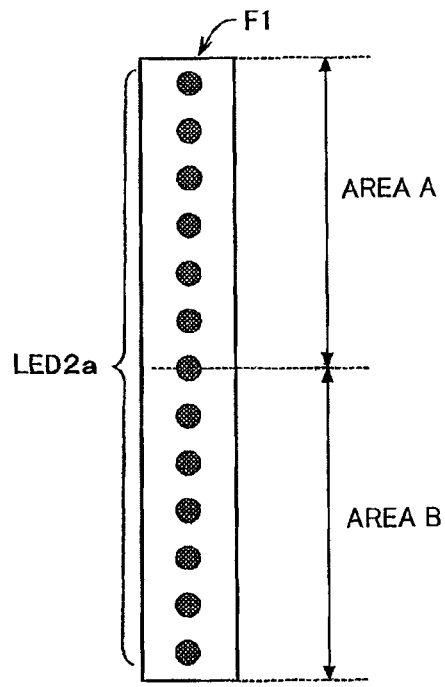

FIG. 4

| | OPERATION | FUNCTION | LED |
|---|---|---|---|
| NORMAL OPERATION | TOUCH ONE POINT, OR SLIDE | LEVEL ADJUSTMENT | TOUCHED POSITION IS ILLUMINATED |
| SPECIAL OPERATION 1 | TOUCH OR TAP TWO OR MORE POINTS | REFFRENCE VALUE SETTING | REFERENCE VALUE IS ILLUMINATED |
| SPECIAL OPERATION 2 | TAP ONE POINT IN UPPER HALF AREA A | SOLO FUNCTION ON/OFF | SOLO CHANNEL IS ILLUMINATED, & LOWERMOST POSITION IS ILLUMINATED FOR OTHER CHANNELS |
| SPECIAL OPERATION 3 | TAP ONE POINT IN LOWER HALF AREA B | MUTE FUNCTION ON/OFF | LOWERMOST POSITION IS ILLUMINATED |

FIG. 5

AUDIO SIGNAL CONTROLLER

BACKGROUND

The present invention relates to controllers for manipulating or operating parameters related to audio signal processing.

In the field of audio signal processing apparatus using a computer, it has heretofore been known to perform audio processing, such as recording, editing, mixing etc. of performance data, through digital signal processing. Apparatus, such as mixers, which are constructed to adjust a plurality of tone signals, have not only a function of adjusting sound volume settings of individual channels via faders or knobs, but also a function of, in response to operation of a given button, sounding a particular channel (i.e., generating a tone for the particular channel, or setting the particular channel in a solo mode) or muting the particular channel (or setting the particular channel in a mute mode). Some of such apparatus have, in addition to the aforementioned functions, a function of returning a sound volume setting to an initial value or reference value. Examples of such conventionally-known techniques are disclosed in Japanese Patent Application Laid-open Publication No. 2007-74359, and Yamaha Digital Mixing Studio n8/n12 Instruction Manual, pp 12-17, [online], Internet <http://www2.yamaha.co.jp/manual/pdf/emi/japan/xg/n12_ja_om_e0.pdf>.

The conventionally-known audio signal processing apparatus have many functions, so that necessary parameters for the entire apparatus have been increasing in number. Because of the many functions, a multiplicity of controls (operators) are required for setting the individual functions and adjusting corresponding parameters, which would undesirably result in an increased size of the audio signal processing apparatus and increased cost of component parts of the apparatus. Further, because of the multiplicity of controls, it tends to be very difficult for a user to find a desired one of the controls, so that a considerable amount of time would be required before the user can operate the desired control. In order to avoid such inconveniences, some users have heretofore employed an approach of allocating a plurality of functions to any one of the controls and causing the one control to selectively perform any one of the allocated functions depending on an operation mode of the apparatus or on a currently displayed screen. With such an approach, however, the user has to switch between various operation modes of the apparatus or between various screens in order to perform a desired one of the allocated functions, which would take a considerable amount of time and labor.

SUMMARY OF THE INVENTION

In view of the foregoing prior art problems, it is an object of the present invention to provide an improved controller which has many functions but does not require a separate control for each of the functions, and which allows a user to readily perform any desired one of the functions.

In order to accomplish the above-mentioned object, the present invention provides an improved controller for operating a parameter related to audio signal processing, which comprises: a control operable by a user; a determination section which determines whether user's operation of the control is normal operation or special operation (i.e., normal operation style or special operation style); and a processing section which performs a function of increasing or decreasing a value of a parameter assigned to the control when the determination section has determined that the user's operation is the normal operation, but performs another function, different from the function of increasing or decreasing a value of a parameter, when the determination section has determined that the user's operation is the special operation.

According to the present invention constructed in the aforementioned manner, one control can be used not only for the normal operation, but also for the special operation such that the other function, different from the function responsive to the normal operation, is performed. Thus, any one of a plurality of types of functions can be selectively performed by the user operating the one control in any one of different styles. In this way, the present invention can eliminate a need for providing a separate control for each desired function and thereby achieve a reduced size and cost of the controller. Further, the present invention can eliminate a need for switching between modes and between screens and selectively using a plurality of buttons and thereby achieve speedy and easy user's operation of the operator.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 4 is a diagram showing a construction of a first embodiment of a fader provided in the controller of the present invention;

FIG. 5 is a table showing correspondence relationship between operation styles and functions of the first embodiment of the fader provided in the controller of the present invention;

DETAILED DESCRIPTION

Figure 1:
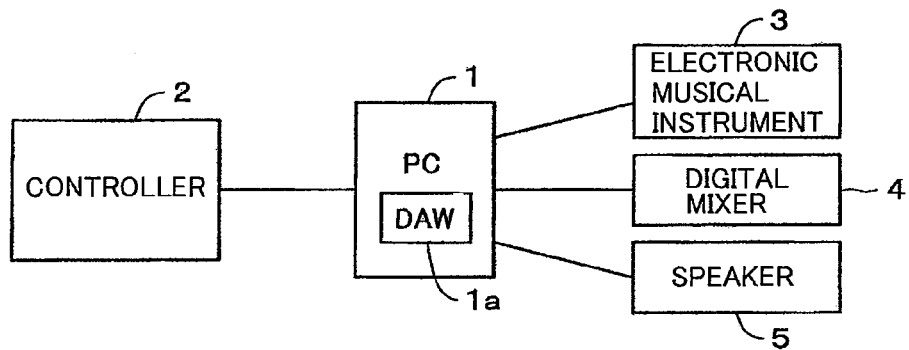
FIG. 1 is a block diagram showing an embodiment of a controller of the present invention connected to a PC (Personal Computer)

FIG. 1 shows an embodiment of a controller of the present invention connected to a PC (Personal Computer) 1. In FIG.

1, the PC 1 has installed therein DAW (Digital Audio Workstation) software that is application software, hereinafter also referred to as DAW 1a, for implementing audio processing functions, such as recording and reproduction, effect impartment, mixing etc. of audio signals. The PC 1 is a device that executes the DAW 1a, and execution, by the PC 1, of the DAW software can implement audio processing functions, such as recording and reproduction, effect impartment, mixing etc. of audio signals. To the PC 1 are connected an electronic musical instrument 3, a digital mixer 4 and a speaker 5, so that audio signals from the electronic musical instrument 3 and digital mixer 4 can be input to the DAW 1a but also audio signals output from the DAW 1a can be supplied to the speaker 5. Also connected to the PC 1 are a mouse and a keyboard so that applications, such as the DAW 1a, can be operated via the mouse and keyboard. Also, a controller 2 dedicated to operating the DAW 1a is connected to the PC 1. The controller 2 is connected to the PC 1 via USB (Universal Serial Bus) facilities.

Figure 3:
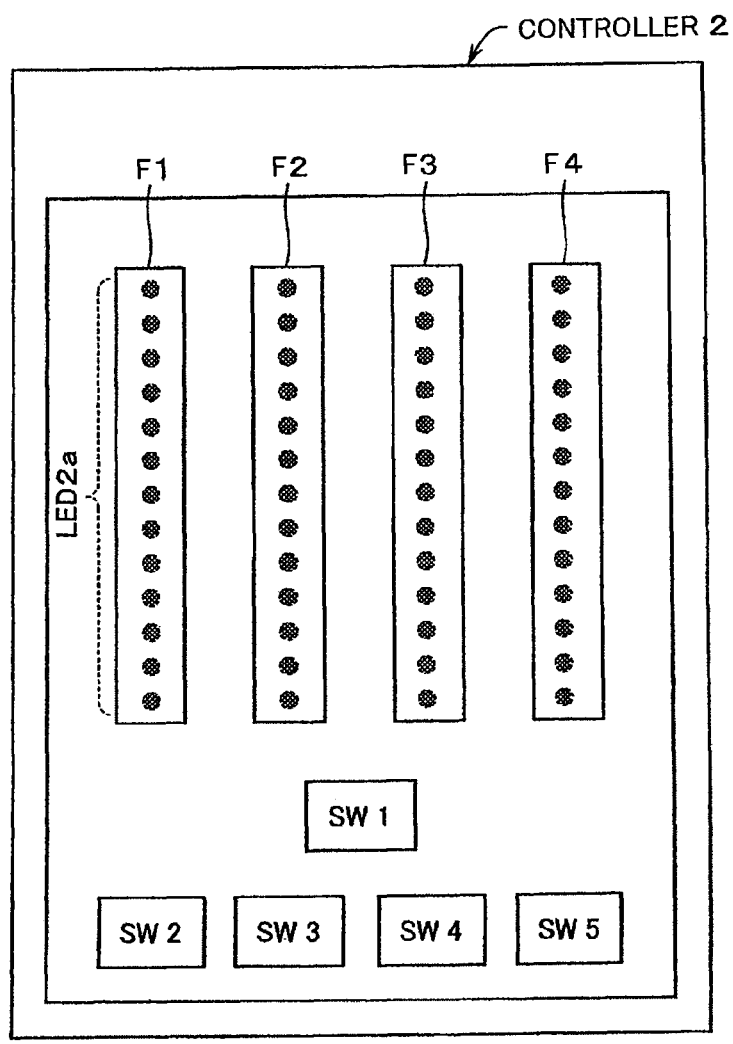
FIG. 3 is a diagram showing an example construction of a panel of the embodiment of the controller.

FIG. 3 shows an example construction of a panel of the controller 2. As shown in FIG. 3, the controller 2 includes four faders F1, F2, F3 and F4. Each of the faders F1 to F4 is a touch-sensitive type control having a vertically elongated touch pad. Each of the four faders F1 to F4 is capable of adjusting a fader level of a channel assigned thereto, by a human operator or user sliding its finger or the like on and along the touch pad. Namely, the vertically elongated touch pad of each of the faders F1 to F4 can detect a current operating position of the fader by detecting a linear position thereof touched, for example, by a finger of the user. Inside the touch pad of each of the faders F1 to F4 are provided a plurality of LEDs 2a disposed at substantially equal intervals along the longitudinal axis of the touch pad for indicating, through illumination of any one of the LEDs 2a, a level set by the user's operation. Namely, a level-displaying, illuminated position (i.e., illuminated LED) in the plurality of LEDs 2a is moved vertically in response to movement of the user's finger on the touch pad, i.e. a level value adjusted by user's operation of the fader. The faders F1 to F4 are each operable in either of two ways or styles: "normal operation (style)"; and "special operation (style)". User's sliding operation on and along the touch pad as noted above is the normal operation that can adjust a level value of the fader. Further, user's operation of the fader F1-F4 where a time length from a user's touch on the touch pad to a user's release from the touch pad, i.e. from a time at which the user started the operation of the fader F1-F4 to a time at which the user released the fader F1-F4, is less than a predetermined time length of about 100 ms is defined herein as "tap" operation, and such tap operation is the special operation that can perform another function than the function performed responsive to the normal operation. Examples of the other function are solo function ON/OFF, mute function ON/OFF, reference value setting, initial value setting and minute adjustment of a parameter value, details of which will be discussed later.

Four channels of consecutive channel numbers are assigned to the faders F1 to F4 of the controller 2, and the assigned channels can be changed by the user depressing or operating any one of switches SW2, SW3, SW4 and SW5 provided on the controller 2. For example, if the switch SW2 or SW3 is operated by the user, the assigned channels are changed by one channel in a channel-No. decreasing or increasing direction. If the switch SW4 or SW5 is operated, the assigned channels are changed by one bank in the channel-No. decreasing or increasing direction.

Note that the channels to be handled by the DAW are divided into groups, each of which is called "bank". Each of the banks consists of a same number the channels, and the number of the channels per bank is the same as the number of the faders provided on the controller 2. Namely, in the instant embodiment, four channels constitute one bank.

Figure 2:
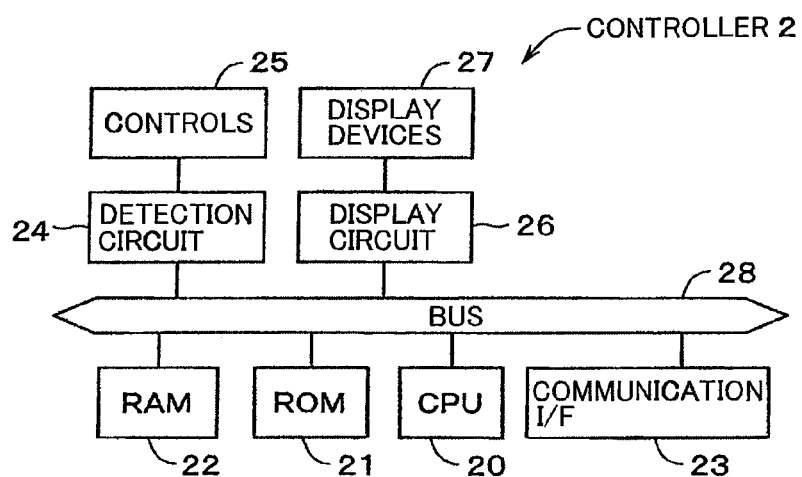
FIG. 2 is a block diagram showing an example hardware setup of the embodiment of the controller of the present invention.

FIG. 2 is a block diagram showing an example hardware setup of the embodiment of the controller 2 of the present invention. As shown in FIG. 2, a CPU (Central Processing Unit) 20 in the controller 2 executes a management program (Operating System or OS) so that general behavior of the controller 2 is controlled by the OS. The controller 2 also includes a non-volatile ROM (Read-Only Memory) 21 in which are stored various programs for execution by the controller 2 and various data, and a RAM (Random Access Memory) 22 in which are stored a working area of the CPU 20 and various data. A communication I/F 23 is a communication interface for connecting the controller 2 to the PC 1, and the communication I/F 23 is, for example, a USB or Ethernet (registered trademark) interface. Display devices 27 are provided in corresponding ones of the faders F1 to F4, each of display devices 27 comprises the plurality of LEDs 2a provided inside the touch pad of the corresponding fader F1-F4 (i.e., built in the corresponding fader F1-F4). A display circuit 26 is a circuit for driving the LEDs 2a constituting the display devices 27. Further, controls 25 include the faders F1 to F4 and the switches SW1 to SW5 operable by the user to instruct that the channels assigned to the faders F1 to F4 be changed, and a detection circuit 24 is a circuit for scanning the controls 25 to detect any operated control and an operation style in which the control has been operated. All of the aforementioned components are connected to a bus 28.

FIG. 4 shows a construction of a first embodiment of the fader F1-F4 provided in the controller 2 of the present invention, and FIG. 5 is a table showing correspondence relation between the operation styles (i.e., normal operation and special operation styles) and functions of the first embodiment of the fader F1-F4. All of the faders F1 to F4 are of a same construction, and thus, only the fader F1 is representatively shown in FIG. 4.

The fader F1 includes the plurality of LEDs 2a provided inside the touch pad thereof for displaying a current level setting along the longitudinal axis, and the touch pad is divided into two areas: an upper half area A; and a lower half area B. In the first embodiment, four styles: (1) normal operation; (2) first-type special operation; (3) second-type special operation; and (4) third-type special operation are defined as the operation styles of the fader F1.

(1) Normal Operation: When the user touches one point of the touch pad of the fader with its finger, or touches one point of the touch pad and then slides its finger on and along the touch pad continuously (i.e., without releasing the finger from the touch pad), such user's operation is determined to be the normal operation, so that the level of the channel assigned to the fader having that touch pad can be adjusted in response to the normal operation. As such normal operation is performed, the LED 2a at the touched position of the touch pad is lit or illuminated, or the illuminated position (or level-displaying position) in the LEDs 2a is moved vertically in response to user's sliding operation. Note that user's operation of the fader F1 where a time length from a user's touch on the touch pad to a user's release from the touch pad is the predetermined time length of about 100 ms or more is defined herein as a "touch", while user's operation of the fader F1 where the time length from a user's touch on the touch pad to a user's release from the touch pad is less than the predetermined time length of about 100 ms is defined as a "tap".

(2) First-type Special Operation: When the user touches or taps two points or more of the touch pad, such user's operation is determined to be the first-type special operation, so that the level value of the channel assigned to the fader having that touch pad is set at a reference value (nominal value indicative of 0 dB). The reference value corresponds to a center position, along the longitudinal axis, of the touch pad, and, as the level value of the channel assigned to the fader is set at the reference value, the LED 2a located at the center position is illuminated. Although it is difficult to accurately set the level value of the fader at the reference value by the normal operation, the level value of the fader can be readily set at the reference value by the first-type special operation. A predetermined initial value rather than the reference value may be set in response to the first-type special operation. In this case, a criterion for determining that user's operation is simultaneous depression (touch or tap) at two points or more of the touch pad is set such that the depressions (touches or taps) at the two points or more need not completely temporally coincide with each other and may be within a predetermined permissible time difference.

(3) Second-type Special Operation: When the user taps one point of the upper half area A of the touch pad, such user's operation is determined to be the second-type special operation, so that the channel assigned to the fader having that touch pad is set in a "solo" mode. As the assigned channel is set in the "solo" mode like this, the LED 2a at the current level position changes from an illuminated state to a blinked state to indicate that the assigned channel has been set in the "solo" mode, while the other channels than the channel having been set in the "solo" mode are muted, i.e. set in a "mute mode". For each of the thus-muted channels, the illuminated position in the LEDs 2a is moved to the lowermost position (or lowermost LED 2a). If the user taps the upper half area A once again, the solo mode is canceled so that the LED 2a at the current level position of the channel having so far been set in the "solo" mode is changed from the blinked state to the illuminated state, but also the "mute" mode of the other channels than the channel having so far been set in the "solo" mode is canceled so that the illuminated position in the LEDs 2a is returned from the lowermost position to the last position.

(4) Third-type Special Operation: When the user taps one point of the lower half area B of the touch pad, such user's operation is determined to be the third-type special operation, so that the channel assigned to the fader having that touch pad is set in the "mute" mode. Thus, the illuminated position in the LEDs 2a is moved to the lowermost position. If the user taps the lower half area B once again, the mute mode is canceled so that the LED 2a of the channel is returned from the lowermost position to the last position.

Namely, a determination is made, in accordance with the touched or tapped area (upper or lower half area A or B), as to which one of the second-type special operation and third-type special operation the user's operation is.

Figure 6:
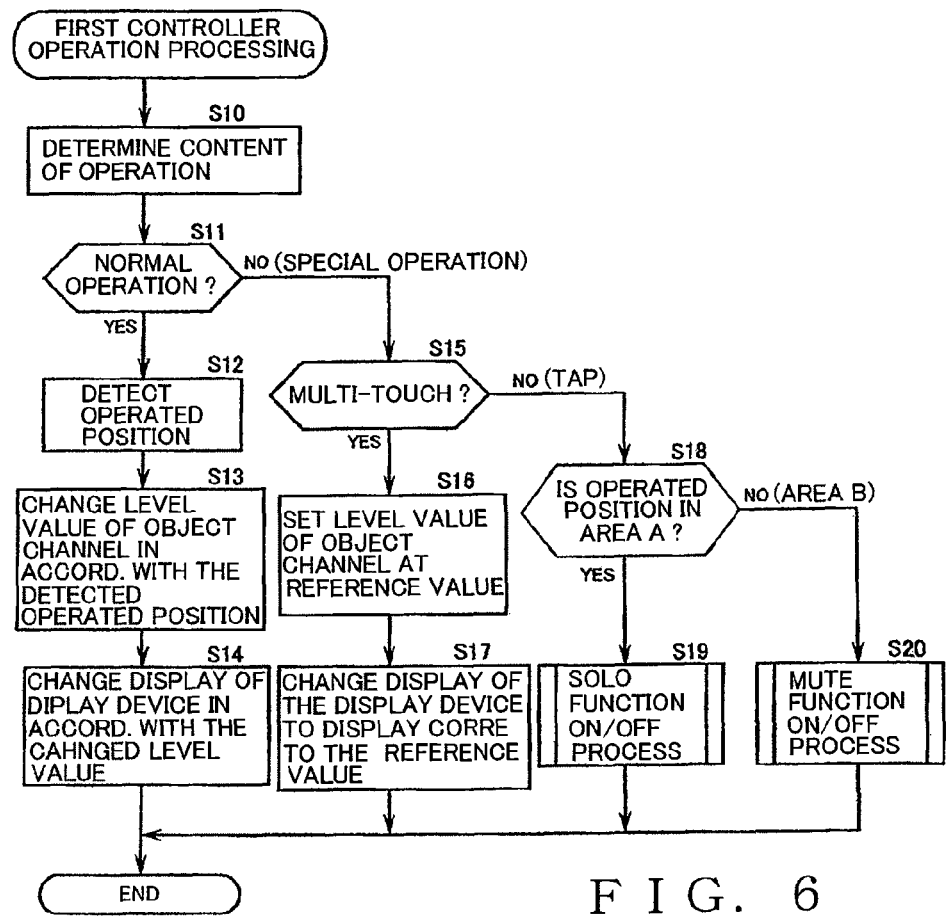
FIG. 6 is a flow chart explanatory of first controller operation processing performed by the controller of the present invention.

FIG. 6 is a flow chart explanatory of first controller operation processing performed by the controller 2 provided with the faders F1 to F4. The first controller operation processing is started up when user's operation of any one of the faders F1 to F4 of the controller 2 has been detected by the detection circuit 24. Content of the detected user's operation of any one of the faders F1 to F4 is determined at step S10, and then a determination is made, at step S11, as to whether or not the detected operation is the normal operation. If the user, having operated one point of the touch pad, has not yet released its finger from the touch pad upon lapse of the predetermined time length (e.g., 100 ms) and has not operated any no other point of the touch pad, then the detected user's operation is determined to be the "normal operation", so that the processing proceeds to step S12. A current operated position on the touch pad is detected at step S12, and then the level value of the channel assigned to the operated fader (i.e., "object channel") is changed in accordance with the detected operated position at step S13; namely, the "object channel" is the channel assigned to the detected operated fader. Then, at step S14, a level-displaying position, i.e. level-displaying LED 2a of the display device 27 is changed in accordance with the changed level value.

If, on the other hand, the detected user's operation has been determined to be not the "normal operation" at step S11 above, the processing branches to step S15, where a determination is made as to whether the detected user's operation is multi-touch operation. When the user has operated another point of the touch pad before the lapse of the predetermined time length (e.g., 100 ms), then the detected user's operation is determined to be the multi-touch operation, so that the processing goes to step S16. At step S16, the level value of the object channel is set at the reference value (or predetermined level). Then, at step S17, the level-displaying position or LED 2a of the display device 27 is changed to a position corresponding to the reference value.

If, on the other hand, the detected user's operation has been determined to be not the multi-touch operation at step S15 above, the detected user's operation is determined to be tap operation where the finger has been released from the touch pad before the lapse of the predetermined time length, so that the processing branches to step S18. Namely, if the duration of the user's operation is less than the predetermined time, the user's operation is determined to be tap operation. A determination is made, at step S18, as to whether the detected user's operation is one having operated the upper half area A of the touch pad, i.e. whether a position operated by the user is located in the upper half area A. If answered in the affirmative at step S18, the processing goes to step S19, where a later described solo function ON/OFF process is performed. If, on the other hand, the detected user's operation is one having operated the lower half area B of the touch pad, i.e. the position operated by the user is located in the lower half area B, as determined at step S18, the processing branches to step S20, where a later described mute function ON/OFF process is performed. Upon completion of the operation of any one of steps S14, S17, S19 and S20, the first controller operation processing is brought to an end.

Figure 7:
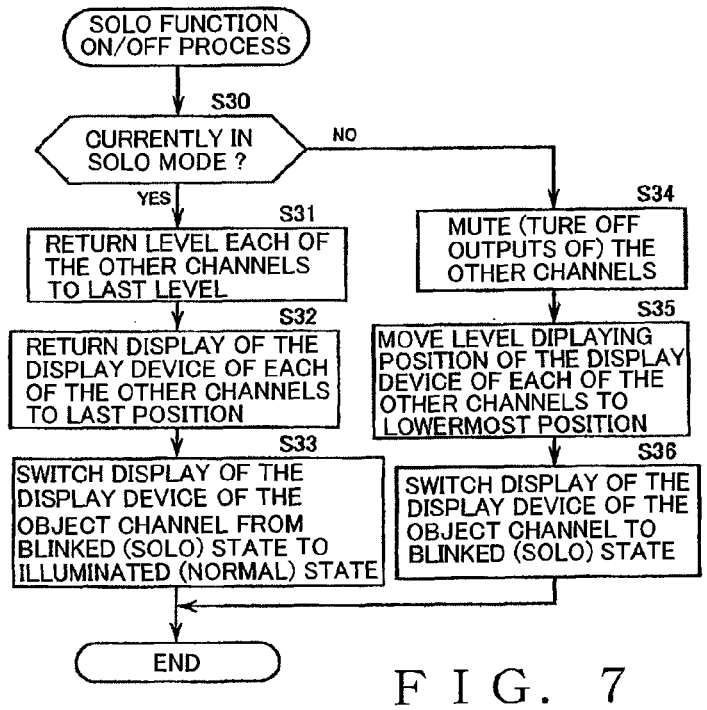
FIG. 7 is a flow chart of a solo function ON/OFF process performed in the first controller operation processing.

FIG. 7 is a flow chart of the solo function ON/OFF process performed at step S19 of the first controller operation processing. Upon start-up of the solo function ON/OFF process, a determination is made, at step S30, whether the object channel is currently in the solo mode. If the object channel is currently in the solo mode as determined at step S30, the process proceeds to step S31, where the levels of the other channels than the object channel are returned to last levels at which the other channels were till immediately before the muting of the other channels. Then, at step S32, the LEDs 2a of the display devices 27 of the other channels than the object channel are returned to last displaying states in which the LEDs 2a were till immediately before the muting of the other channels. At step S33, the displaying state of the LEDs 2a of the display device 27 of the object channel is changed from the blinked state indicative of a solo state to the illuminated state indicative of a normal state.

Further, if it has been determined at step S30 that the object channel is not currently in the solo mode, the process branches to step S34, where the other channels than the object channel are muted or set in the mute mode (i.e., outputs of the other channels are turned off). Then, at step S35, the level-displaying LED 2a in the display device 27 of each of the other channels than the object channel is moved to the lowermost position. Further, at step S36, the level-displaying LED 2a in the display device 27 of the object channel is switched to the blinked state indicative of the solo state. Upon completion of step S33 or S36, the solo function ON/OFF process is brought to an end.

Figure 8:
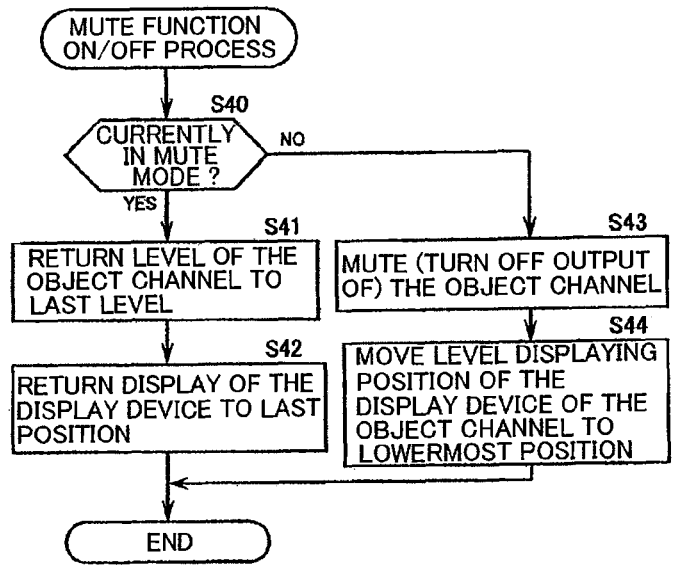
FIG. 8 is a flow chart of a mute function ON/OFF process performed in the first controller operation processing.

FIG. 8 is a flow chart of the mute function ON/OFF process performed at step S20 of the first controller operation processing. Upon start-up of the mute function ON/OFF process, a determination is made, at step S40, whether the object channel is currently in the mute mode. If the object channel is currently in the mute mode as determined at step S40, the process proceeds to step S41, where the object channel is returned to its last level at which the object channel was till immediately before the muting of the object channel. Then, at step S42, the level-displaying LED 2a in the display device 27 of the object channel is returned to its last displaying state (position) in which it was till immediately before the muting of the object channel.

Further, if it has been determined at step S40 that the object channel is not currently in the mute mode, the process branches to step S43, where the object channel is muted or set in the mute mode (i.e., output of the object channels is turned off). Then, at step S44, the level-displaying LED 2a in the display device 27 of the object channel is moved to the lowermost position. Upon completion of step S42 or S44, the mute function ON/OFF process is brought to an end.

As set forth above, detected user's operation of the fader where the time length from a touch on the touch pad to a release from the touch pad is less than the predetermined time length of about 100 ms is determined to be "tap" operation. Thus, even when the user touches the touch pad by mistake, such user's operation too may be undesirably determined to be a tap, so that the channel assigned to the fader may be set in the solo or mute mode against user's intention. Therefore, an arrangement may be made such that user's operation of the fader is determined to be a tap only when the user has touched the touch pad while simultaneously depressing or operating the switch SW1 and if the time length from a touch on the touch pad to a release from the touch pad is less than the predetermined time length of about 100 ms. Namely, for the special operation that is considered highly likely to be performed erroneously, such erroneous operation can be avoided if an arrangement is made such that user's operation is determined to be special operation only when the user has operated the fader in combination of operation of another control.

The present invention is not limited to the above-described, and, for example, long depression equal to or longer than another predetermined time length (e.g., 2 sec) may be determined to be another type of special operation, and operation having a duration of depression less than the other predetermined time length may be determined to be the normal operation.

Figure 9:
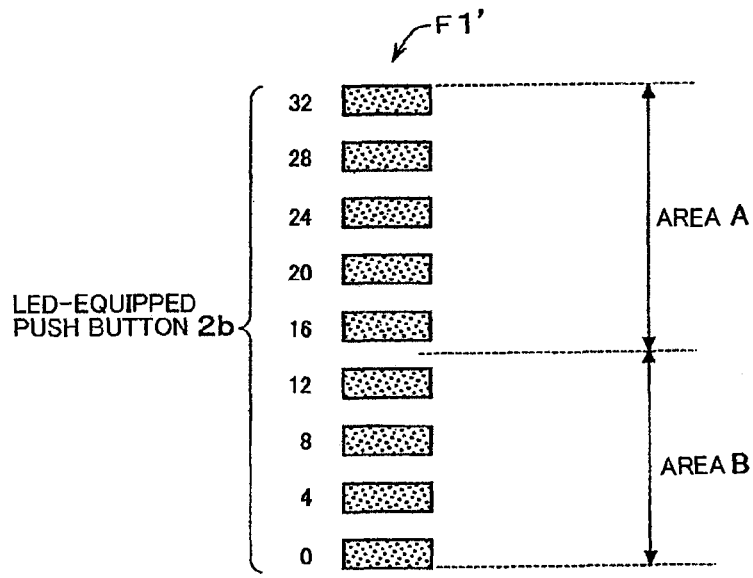
FIG. 9 is a diagram showing a construction of a second embodiment of the fader provided in the controller of the present invention.
Figures 10, 11:
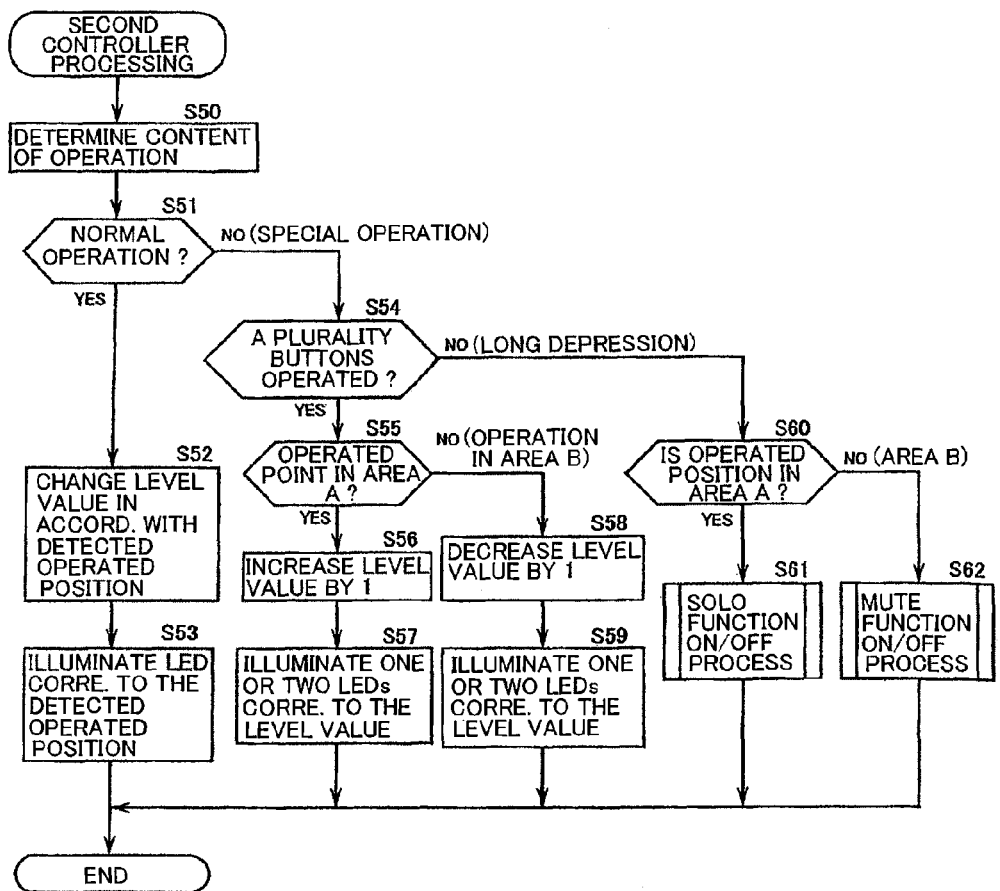
FIG. 10 is a table showing correspondence relationship between operation styles and functions of the second embodiment of the fader provided in the controller of the present invention.
FIG. 11 is a flow chart explanatory of second controller operation processing performed by the controller of the present invention.

FIG. 9 shows a construction of a second embodiment of the fader F1' provided in the controller 2 of the present invention, and FIG. 10 is a table showing correspondence relation between operation styles (i.e., normal operation and special operation styles) and functions of the second embodiment of the fader. All of the faders F1' to F4' are of a same construction, and thus, only the fader F1' is representatively shown in FIGS. 9 and 10.

As shown in FIG. 9, the second embodiment of the fader F1' includes nine LED-equipped push buttons 2b arranged linearly vertically. In the illustrated example of FIG. 9, the level is adjustable in nine steps with the nine LED-equipped push buttons 2b. The level can be increased by 4 (adjusted by +4) per push button 2b; namely, levels corresponding to multiples of four in a range of values 0 to 32 can be set with the nine LED-equipped push buttons 2b. Namely, the fader F1' is constructed as a plural-button type level controller, and the controller 2 includes four such faders F1' to F4' of the aforementioned construction.

The second embodiment of the fader F1' is divided into two areas: an upper half area A; and a lower half area B. As the operation styles of the fader F1' are defined five styles: (1) normal operation; (2) first-type special operation; (3) second-type special operation; (4) third-type special operation; and (5) fourth-type special operation.

(1) Normal Operation: When the user depresses one of the LED-equipped push buttons 2b, such user's operation is determined to be the normal operation. In this case, a level value is set roughly because the level is increased by 4 per push button 2b; that is, each of the LED-equipped push button 2bs represents a +4 level increment. Also, the LED built in the LED-equipped push button 2b is illuminated.

(2) First-type Special Operation: When the user simultaneously depresses two or more LED-equipped push buttons 2b including at least one LED-equipped push button 2b located in (i.e., belonging to) the upper half area A, such user's operation is determined to be the first-type special operation, so that the level value of the channel assigned to the fader is adjusted by +1. Also, one or two LEDs built in one or two LED-equipped push buttons 2b located at one or two positions corresponding to the adjusted level value are illuminated.

(3) Second-type Special Operation: When the user simultaneously depresses two or more LED-equipped push buttons 2b only in the lower half area B of the fader, such user's operation is determined to be the second-type special operation, so that the level value of the channel assigned to the fader is adjusted by −1. Also, one or two LEDs built in one or two LED-equipped push buttons 2b located at one or two positions corresponding to the adjusted level value are illuminated.

(4) Third-type Special Operation: When the user depresses for a relatively long time (i.e., long-depresses) one LED-equipped push button 2b only in the upper half area A of the fader, such user's operation is determined to be the third-type special operation. Thus, the channel assigned to the fader is set in the solo mode, but also the other channels than the channel set in the solo mode are set in the mute mode (i.e., muted) so that the level-displaying, illuminated position in the LEDs built in the LED-equipped push button 2b of each of the faders corresponding to the muted channels is moved to the lowermost position. If the user long-depresses once again the LED-equipped push button 2b in the upper half area A, the solo mode of the channel assigned to the fader is canceled and the mute mode of the other channels is canceled, but also the illuminated position in the LEDs of each of the muted channels is returned to the last position. Note that user's depression of any one of the LED-equipped push buttons 2b is determined to be "long depression" if the time length from the depression of the button 2b to a release from the button 2b (i.e., time length from a time at which the user started the depression of the button 2b to a time at which the user released the button 2b) is about 1 sec or more.

(5) Fourth-type Special Operation: When the user long-depresses one LED-equipped push button 2b of the fader only in the lower half area B of the fader, such user's operation is determined to be the fourth-type special operation, so that the channel assigned to the fader is set in the mute mode (i.e., muted). The level-displaying, illuminated position in the LED-equipped push buttons 2b of the fader of the muted channel is moved to the lowermost position. If the user long-depresses once again the LED-equipped push button 2b in the lower half area B, the mute mode is canceled, and the illuminated position in the LED-equipped push buttons 2b is returned to the last position.

FIG. 11 is a flow chart explanatory of second controller operation processing performed by the controller 2 provided with the faders F1' to F4'. The second controller operation processing is started up when user's operation of any one of the faders F1' to F4' of the controller 2 has been detected by the detection circuit 24. Content of the detected user's operation of any one of the faders F1' to F4' is determined at step S50, and then a determination is made, at step S51, as to whether or not the detected operation is the normal operation. When the user operates one of the LED-equipped push buttons 2b and released its finger from the LED-equipped push button 2b before the lapse of the predetermined time length of about 1 sec, the detected user's operation is determined to be the "normal operation", so that the processing proceeds to step S52. At step S52, a position of the operated LED-equipped push button 2b is detected, so that the level value of the channel assigned to the operated fader (i.e., "object channel") is changed in accordance with the detected operated position. Then, at step S53, the LED built in the operated LED-equipped push button 2b, i.e. the LED corresponding to the detected operated position, is illuminated.

If, on the other hand, the detected user's operation has been determined to be not the "normal operation" at step S51 above, the processing branches to step S54, where a determination is made as to whether, in the detected user's operation, the user has operated a plurality of the LED-equipped push buttons 2b before the lapse of the predetermined time length of about 1 sec. If user's operation of a plurality of the LED-equipped push buttons 2b has been detected before the lapse of the predetermined time length of about 1 sec, a YES determination is made at step S54, the processing branches to step S55. At step S55, positions of the operated LED-equipped push buttons 2b are detected, and then a determination is made, on the basis of the detected positions of the operated LED-equipped push buttons 2b, as to which one of the operated LED-equipped push buttons 2b is located in (belongs to) the upper half area A. If at least one of the operated LED-equipped push buttons 2b is located in the upper half area A as determined at step S55, the detected user's operation is determined to be the "first-type special operation", so that the processing branches to step S56 where the level value of the object channel is increased by 1, i.e. adjusted by +1. Then, at step S57, one or two LEDs built in one or two LED-equipped push buttons 2b located at one or two positions corresponding to the thus-set level value are illuminated. More specifically, if the set level value is a multiple of four, the LED of only one LED-equipped push button 2b located at a position corresponding to the thus-set level value is illuminated, or if the set level value is not a multiple of four, the LEDs of two LED-equipped push buttons 2b located at positions corresponding to two values preceding and succeeding the set level value are illuminated.

Further, if all of the operated LED-equipped push buttons 2b are located in the lower half area B, the detected user's operation is determined to be the "second-type special operation", so that the processing branches to step S58 where the level value of the object channel is decreased by 1, i.e. adjusted by −1. Then, at step S59, one or two LEDs built in one or two LED-equipped push buttons 2b located at one or two positions corresponding to the thus-set level value are illuminated.

If the user has not operated a plurality of the LED-equipped push buttons 2b before the lapse of the predetermined time length of about 1 sec as determined at step S54, it is determined that, in the user's operation, the user has long-depressed the LED-equipped push button 2b, so that the processing branches to step S60. At step S60, a determination is made as to whether the long-depressed LED-equipped push button 2b is located in the upper half area A. If answered in the affirmative at step S60, the processing proceeds to step S61, where a solo function ON/OFF is performed. If, on the other hand, the long-depressed LED-equipped push button 2b is located in the lower half area B, the processing branches to step S62, where a mute function ON/OFF is performed.

Upon completion of the operation of any one of steps S53, S57, S59 and S61, the second controller operation processing is brought to an end.

The solo function ON/OFF process performed at step S61 in the second controller operation processing is the same as the solo function ON/OFF process shown in FIG. 7, and the mute function ON/OFF process performed at step S62 in the second controller operation processing is the same as the mute function ON/OFF process shown in FIG. 8.

In the above-described embodiments, channels assigned to the individual faders F1-F4 or F1'-F4' may be fixed, and any desired types of parameters may be assigned to the individual faders F1-F4 or F1'-F4'.

In the controller of the present invention, the correspondence relationship between the operation styles and the functions of the faders is not limited to the above-described, and what kinds of functions should be associated with what kinds of operation styles may be chosen as desired. In this case, if the user has operated the upper half area A of any one of the faders, a function that should be made prominent, such as a solo function, may be associated with the one fader while, if the user has operated the lower half area B of any one of the faders, a function that should be made non-prominent, such as a mute function, may be associated with the one fader. In this way, the present invention can achieve enhanced usability of the controller.

Furthermore, the controller of the present invention is applicable to electronic musical instruments, tone reproduction apparatus, audio equipment, etc. The controls of the controller of the present invention are not limited to the linear fader type controls, and they may be rotary type encoders or knobs, or the like. Furthermore, the style for operating the control may be double-clicking, double-tapping, flicking (i.e. touching the touch pad with a light quick blow), or the like; namely, any desired operating style may be employed as long as the operating style does not use any other control and permits clear identification of content of user's operation.

Furthermore, in the case where a different function is assigned in accordance with an operated position on the fader, the fader may be divided into a greater number of areas without being limited to the aforementioned upper and lower half areas. Other functions than the above-described may be associated with or allocated to the various types of special operation, such as functions of switching between parts to be operated (object parts), switching between parameters to be operated (object parameters), changing a type of parameter to be assigned to the fader, increasing and decreasing a parameter value by a predetermined ratio, etc. Furthermore, the display device may be a touch panel shared with the touch-type control, a display provided separately from the control, LEDs provided in the neighborhood of the control, or the like.

The present application is based on, and claims priority to, Japanese Patent Application No. 2011-073958 filed on Mar. 30, 2011. The disclosure of the priority application, in its entirety, including the drawings, claims, and the specification thereof, is incorporated herein by reference.

What is claimed is:

1. A controller, comprising:
a control operable by a user and having a parameter related to audio signal processing assigned to the control;
a determination section which determines whether the user's operation of the control is a normal operation or a special operation; and
a processing section which performs a function of increasing or decreasing a value of the parameter assigned to the control in a case where said determination section has determined that the user's operation of the control is the normal operation, but performs another function, different from said function of increasing or decreasing the value of the parameter assigned to the control, in a case where said determination section has determined that the user's operation of the control is the special operation,
wherein the control has an area operable to detect the user's operation of the control, the area including a first region and a second region different from the first region,
wherein said determination section determines the user's operation of the control to be the normal operation in a case where a first-type input of the user is detected in the first region and in a case where the first-type input of the user is detected in the second region,
wherein said determination section determines the user's operation of the control to be the special operation in a case where a second-type input of the user is detected in the first region, the second-type input being different from the first-type input,
wherein the special operation includes a first special operation and a second special operation, and said determination section determines the user's operation of the control to be the first special operation in the case where the second-type input of the user is detected in the first region, and said determination section determines the user's operation of the control to be the second special operation in a case where the second-type input of the user is detected in the second region, and
wherein said processing section performs a first function in a case where said determination section determines that the user's operation of the control is the first special operation, and performs a second function different from the first function in a case where said determination section determines that the user's operation of the control is the second special operation.

2. The controller as claimed in claim 1, wherein the first-type input differs from the second-type input according to a time length from a time at which the user started the operation of the control to a time at which the user released the control.

3. The controller as claimed in claim 1, wherein said determination section further determines the user's operation of the control to be the special operation in a case where the first-type input of the user is simultaneously detected at a plurality of positions in the area operable to detect the user's operation of the control.

4. The controller as claimed in claim 1, further comprising a display section which displays a current parameter value set via the normal operation and a current state of the another function.

5. The controller as claimed in claim 1, wherein the special operation further includes a third special operation, and said determination section determines whether the user's operation of the control is the first special operation, the second special operation, or the third special operation, and
said processing section performs a third function different from the first and second functions in a case where said determination section determines that the user's operation of the control is the third special operation.

6. The controller as claimed in claim 1, wherein a plurality of controls are provided, and each of the plurality of the controls is assignable to any one of a plurality of audio-signal-processing channels.

7. The controller as claimed in claim 6, wherein the another function is to set, at a predetermined level, an audio signal to be processed in a selected one of the plurality of audio-signal-processing channels.

8. The controller as claimed in claim 6, wherein the another function is to not mute an audio signal to be processed in a selected one of the plurality of audio-signal-processing channels and to mute an audio signal to be processed in a channel other than the selected one channel.

9. The controller as claimed in claim 6, wherein the another function is to mute an audio signal to be processed in a selected one of the plurality of audio-signal-processing channels and to not mute an audio signal to be processed in a channel other than the selected one channel.

10. The controller as claimed in claim 1, further comprising another control operable by a user, the another control being spaced apart from the control,
wherein said determination section determines that the user's operation of the control is the special operation only if the user operates the control in combination with simultaneous operation of the another control.

11. The controller as claimed in claim 1,
wherein said determination section determines the user's operation of the control to be the normal operation in a case where a single touch input of the user is detected in the first region and in a case where a single touch input of the user is detected in the second region, and
wherein said determination section determines the user's operation of the control to be the special operation in a case where a tap input of the user is detected in the first region.

12. The controller as claimed in claim 11, wherein said determination section determines the user's operation of the control to be the first special operation in the case where the tap input of the user is detected in the first region, and said determination section determines the user's operation of the control to be the second special operation in a case where a tap input of the user is detected in the second region.

13. The controller as claimed in claim 1,
wherein said determination section determines the user's operation of the control to be the normal operation in a case where a slide input of the user is detected in the first region and in a case where a slide input of the user is detected in the second region, and
wherein said determination section determines the user's operation of the control to be the special operation in a case where a tap input of the user is detected in the first region.

14. The controller as claimed in claim 13, wherein said determination section determines the user's operation of the control to be the first special operation in the case where the tap input of the user is detected in the first region, and said determination section determines the user's operation of the control to be the second special operation in a case where a tap input of the user is detected in the second region.

15. A computer-implemented method comprising:
determining whether a user's operation of a control is a normal operation or a special operation, the control having a parameter related to audio signal processing assigned to the control; and performing a function of increasing or decreasing a value of the parameter assigned to the control in a case where the user's operation of the control is determined to be the normal operation, but performing another function, different from said function of increasing or decreasing the value of the parameter assigned to the control, in a case where the user's operation of the control is determined to be the special operation, wherein the control has an area operable to detect the user's operation of the control, the area including a first region and a second region different from the first region, wherein the user's operation of the control is determined to be the normal operation in a case where a first-type input of the user is detected in the first region and in a case where the first-type input of the user is detected in the second region, wherein the user's operation of the control is determined to be the special operation in a case where a second-type input of the user is detected in the first region, the second-type input being different from the first-type input, wherein the special operation includes a first special operation and a second special operation, and the user's operation of the control is determined to be the first special operation in the case where the second-type input of the user is detected in the first region, and the user's operation of the control is determined to be the second special operation in a case where the second-type input of the user is detected in the second region, and wherein a first function is performed in a case where the user's operation of the control is determined to be the first special operation, and a second function different from the first function is performed in a case where the user's operation of the control is determined to be the second special operation.

16. A non-transitory computer-readable storage medium containing a group of instructions for causing a processor to perform a method, said method comprising:

determining whether a user's operation of a control is a normal operation or a special operation, the control having a parameter related to audio signal processing assigned to the control; and performing a function of increasing or decreasing a value of the parameter assigned to the control in a case where the user's operation of the control is determined to be the normal operation, but performing another function, different from said function of increasing or decreasing the value of the parameter assigned to the control, in a case where the user's operation of the control is determined to be the special operation, wherein the control has an area operable to detect the user's operation of the control, the area including a first region and a second region different from the first region, wherein the user's operation of the control is determined to be the normal operation in a case where a first-type input of the user is detected in the first region and in a case where the first-type input of the user is detected in the second region, wherein the user's operation of the control is determined to be the special operation in a case where a second-type input of the user is detected in the first region, the second-type input being different from the first-type input, wherein the special operation includes a first special operation and a second special operation, and the user's operation of the control is determined to be the first special operation in the case where the second-type input of the user is detected in the first region, and the user's operation of the control is determined to be the second special operation in a case where the second-type input of the user is detected in the second region, and wherein a first function is performed in a case where the user's operation of the control is determined to be the first special operation, and a second function different from the first function is performed in a case where the user's operation of the control is determined to be the second special operation.

17. An apparatus, comprising:

a control operable by a user and having a parameter related to audio signal processing assigned to the control;

a storage device; and a processor configured to execute computer executable instructions recorded on the storage device, the computer executable instructions including instructions, that when executed by the processor, cause the apparatus to:

determine whether a user's operation of the control is a normal operation or a special operation; and perform a function of increasing or decreasing a value of the parameter assigned to the control in a case where the user's operation of the control is determined to be the normal operation, but perform another function, different from said function of increasing or decreasing the value of the parameter assigned to the control, in a case where the user's operation of the control is determined to be the special operation, wherein the control has an area operable to detect the user's operation of the control, the area including a first region and a second region different from the first region, wherein the user's operation of the control is determined to be the normal operation in a case where a first-type input of the user is detected in the first region and in a case where the first-type input of the user is detected in the second region, wherein the user's operation of the control is determined to be the special operation in a case where a second-type input of the user is detected in the first region, the second-type input being different from the first-type input, wherein the special operation includes a first special operation and a second special operation, and the user's operation of the control is determined to be the first special operation in the case where the second-type input of the user is detected in the first region, and the user's operation of the control is determined to be the second special operation in a case where the second-type input of the user is detected in the second region, and wherein a first function is performed in a case where the user's operation of the control is determined to be the first special operation, and a second function different from the first function is performed in a case where the user's operation of the control is determined to be the second special operation.

* * * * *